3,004,889
CYCLOBUTANE ANALGESICS
Samuel Kuna, Westfield, and Armin G. Wilson, Highland Park, N.J., assignors to Bristol-Myers Company, New York, N.Y., a corporation of Delaware
No Drawing. Filed May 16, 1960, Ser. No. 29,153
17 Claims. (Cl. 167—65)

This invention relates to therapeutic compositions. More specifically, this invention relates to compositions containing certain cyclobutane derivatives which can be used as analgesics or as central nervous system stimulants.

The therapeutic compositions of this invention comprise, as the therapeutically active agent, a cyclobutane derivative having the following generic formula:

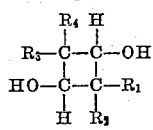

wherein each of $R_1$, $R_2$, $R_3$, and $R_4$ is a hydrocarbon radical containing up to about 8 carbon atoms. Illustratively, each of the hydrocarbon radicals can be a straight or branched chain alkyl; an unsaturated hydrocarbon, such as a straight or branched chain olefin; a cycloalkyl; the phenyl radical; or the benzyl radical. All of the hydrocarbon radicals on the cyclobutane derivative as represented by the above generic formula need not be the same; although it is preferred that each of $R_1$ and $R_4$ be the same radical and that each of $R_2$ and $R_3$ be the same radical and differing from $R_1$ and $R_4$, or that all the hydrocarbon radicals of $R_1$, $R_2$, $R_3$ and $R_4$ be the same.

Illustrative of specific compounds suitable for this invention there can be mentioned: 2,2,4,4-tetramethyl 1,3-cyclobutanediol; 2,2,4,4-tetraethyl 1,3-cyclobutanediol; 2,2,4,4-tetraisopropyl 1,3-cyclobutanediol; 2,2,4,4-tetrapropyl 1,3-cyclobutanediol; 2,2,4,4-tetra (tertiary butyl) 1,3-cyclobutanediol; 2,2,4,4-tetrabutyl 1,3-cyclobutanediol; 2,2,4,4-tetra ( n-pentyl) 1,3-cyclobutanediol; 2,2,4,4-tetraphenyl 1,3-cyclobutanediol; 2,2,4,4-tetracyclohexyl 1,3-cyclobutanediol; 2,2,4,4-tetrabenzyl 1,3-cyclobutanediol; 2,2,4,4-tetrallyl 1,3-cyclobutanediol; 2,2,4,4-tetra(1-butenyl) 1,3-cyclobutanediol; 2,2,4,4-tetra(1-heptenyl) 1,3-cyclobutanediol; 2,4-dimethyl 2,4-diethyl 1,3-cyclobutanediol; 2,4-dimethyl 2,4-dipropyl 1,3-cyclobutanediol; 2,4-diethyl 2,4-diisopropyl 1,3-cyclobutanediol; 2,4-diethyl 2,4-di(tertiary butyl) 1,3-cyclobutanediol; 2,4-dimethyl 2,4-diphenyl 1,3-cyclobutanediol; 2,4-dimethyl 2,4-dibenzyl 1,3-cyclobutanediol; 2,4-dicyclohexyl 2,4-diethyl 1,3-cyclobutanediol; 2,4-diallyl 2,4-diethyl 1,3-cyclobutanediol; and 2-methyl 2-ethyl 4-propyl 4-(n-pentyl) 1,3-cyclobutanediol.

The cyclobutane derivatives of this invention can be prepared by a number of methods including those set forth in U.S. Patent 2,936,324, which issued on May 10, 1960; and Organic Reactions, vol. III, pages 108 to 136, edited by Roger Adams and published by John Wiley and Sons, Inc. (1946).

The cyclobutanediols of this invention can be administered by the conventional methods, the conventional types of unit dosages or with the conventional pharmaceutical carriers to produce an analgesic or central nervous system stimulant effect in human beings and animals. Oral administration by the use of tablets, capsules or in liquid form such as suspensions, or emulsions is particularly advantageous. When formed into tablets, the conventional binding and disintegrating agents used in therapeutic unit dosages can be employed. Illustrative of binding agents there can be mentioned glucose, lactose, gum acacia, gelatin, mannitol, starch paste, magnesium trisilicate and talc. Illustrative of disintegrating agents there can be mentioned corn starch, keratin, colloidal silica and potato starch. When administered as liquids the conventional liquid carriers can be used.

The unit dosage or therapeutically effective quantity of the cyclobutanediols of this invention for human beings can vary over wide limits such as that of about 0.1 of a grain to about 20 grains or more such as over 50 grains. The upper limit is limited only by the degree of effect desired and economic considerations. For oral administration it is preferable to employ from about 1 to about 10 grains of the therapeutic agent per unit dosage. It is indicated from animal experiments that about 1 to about 10 grain dosages administered orally four times daily as needed will provide a preferred daily dosage. Of course, the dosage of the particular therapeutic agent used can vary considerably, such as the age of the patient and the degree of therapeutic effect desired. Each unit dosage form of the novel therapeutic compounds can contain from about 5% to about 95% and preferably from about 10% to 80% of the novel therapeutic agents by weight of the entire composition with the remainder comprising conventional pharmaceutical carriers. By the term pharmaceutical carrier we intend to include non-therapeutic materials which are conventionally used with unit dosages and includes fillers, diluents, binders, lubricants, disintegrating agents and solvents. Of course, it is possible to administer the novel therapeutics, i.e., the pure compounds, without the use of a pharmaceutical carrier. When the therapeutic agents of this invention are employed for one of their enumerated utilities such as analgesics for the amelioration of pain such as the common headache, mild rheumatism and the like, they can be administered either prior to or after the onset of the discomfort.

The invention is illustrated by the following examples of suitable therapeutic compositions in unit dosage form, although it is not intended that the compositions or dosages be limited by any of the proportions, amounts, types of carriers, or dosage units set forth therein.

EXAMPLE 1

A suitable formulation of tablets consists of:

|   | Grams |
|---|---|
| (1) 2,2,4,4-tetraethyl 1,3-cyclobutanediol | 12.5 |
| (2) Lactose | 80 |
| (3) Starch | 5 |
| (4) Magnesium stearate | 2 |

The 2,2,4,4-tetraethyl 1,3-cyclobutanediol, lactose and starch are thoroughly mixed and granulated. For tabletting, the magnesium stearate is added, mixed with the granules, and the mixture tabletted on a rotary press. Use of this procedure produces 100 tablets each containing 125 mg. of the active therapeutic agent.

EXAMPLE 2

Another suitable formulation of tablets consists of:

|   | Grams |
|---|---|
| (1) 2,4-dimethyl 2,4-diethyl 1,3-cyclobutanediol | 25 |
| (2) Mannitol | 160 |
| (3) Starch | 10 |
| (4) Magnesium stearate | 4 |

The 2,4-dimethyl 2,4-diethyl 1,3-cyclobutanediol mannitol and starch are thoroughly mixed and granulated. For tabletting, the magnesium stearate is added, mixed with granules, and the mixture tabletted on a rotary press. Use of this procedure produces 100 tablets each containing 250 mg. of the active therapeutic agent.

EXAMPLE 3

Another suitable formulation of tablets consists of:

|  | Grams |
|---|---|
| (1) 2,2,4,4-tetraisopropyl 1,3-cyclobutanediol | 25 |
| (2) b-Lactose | 70 |
| (3) Dextrin | 10 |
| (4) Hydrogenated vegetable oil | 0.5 |
| (5) Talc | 2 |

The 2,2,4,4-tetraisopropyl 1,3-cyclobutanediol b-lactose, and dextrin are thoroughly mixed and granulated. For tabletting, the hydrogenated vegetable oil and talc are added, mixed with the granules, and the mixture tabletted on a rotary press. Use of this procedure produces 200 tablets of 125 mg. of active thereapeutic agent.

Either the cis isomer, the trans isomer or mixtures of these two isomers of the cyclobutanediols of this invention can be employed for their therapeutic effects.

What is claimed is:

1. An analgesic composition in unit dosage form comprising a significant quantity of a pharmaceutical carrier and from about 0.1 grain to about 20 grains of a cyclobutane derivative having the following generic formula:

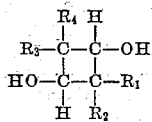

wherein each of $R_1$, $R_2$, $R_3$ and $R_4$ is a hydrocarbon radical containing up to about 8 carbon atoms.

2. The analgesic composition of claim 1 wherein each of the hydrocarbon radicals containing up to about 8 carbon atoms is a member selected from the group consisting of an alkyl radical, an alkylene radical, the phenyl radical, a cycloalkyl radical having from 4 to 6 carbon atoms and the benzyl radical.

3. The analgesic composition of claim 1 wherein each of $R_1$, $R_2$, $R_3$ and $R_4$ is an alkyl radical.

4. The analgesic composition of claim 1 wherein each of $R_1$, $R_2$, $R_3$ and $R_4$ is the phenyl radical.

5. An analgesic composition in unit dosage form comprising a significant quantity of a pharmaceutical carrier and from about 1 grain to about 10 grains of a cyclobutane derivative having the following generic formula:

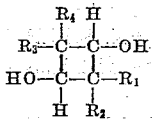

wherein each of $R_1$, $R_2$, $R_3$ and $R_4$ is an alkyl radical containing from 1 to 4 carbon atoms.

6. The analgesic composition of claim 5 wherein the cyclobutane derivative is 2,2,4,4-tetramethyl 1,3-cyclobutanediol.

7. The analgesic composition of claim 5 wherein the cyclobutane derivative is 2,4-diethyl 2,4-dimethyl 1,3-cyclobutanediol.

8. The analgesic composition of claim 5 wherein the cyclobutane derivative is 2,2,4,4-tetraethyl 1,3-cyclobutanediol.

9. The analgesic composition of claim 5 wherein the cyclobutane derivative is 2,2,4,4-tetraisopropyl 1,3-cyclobutanediol.

10. A method for inducing analgesic which comprises administering to an animal, including a human, an analgesically effective quantity of a cyclobutane derivative having the following generic formula:

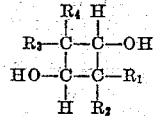

wherein each of $R_1$, $R_2$, $R_3$ and $R_4$ is a hydrocarbon radical containing up to about 8 carbon atoms.

11. The method of claim 10 wherein each of the hydrocarbon radicals containing up to about 8 carbon atoms is a member selected from the group consisting of an alkyl radical, an alkylene radical, the phenyl radical, a cycloalkyl radical having from 4 to 6 carbon atoms and the benzyl radical.

12. The method of claim 10 wherein each of $R_1$, $R_2$, $R_3$ and $R_4$ is an alkyl radical.

13. A method for inducing analgesic which comprises administering to an animal, including a human, from about 0.1 to about 20 grains per unit dosage of a cyclobutane derivative having the following generic formula:

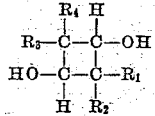

wherein each of $R_1$, $R_2$, $R_3$, and $R_4$ is an alkyl radical containing from 1 to 4 carbon atoms.

14. The method of claim 13 wherein the cyclobutane derivative is 2,2,4,4-tetramethyl 1,3-cyclobutanediol.

15. The method of claim 13 wherein the cyclobutane derivative is 2,4-diethyl 2,4-dimethyl 1,3-cyclobutanediol.

16. The method of claim 13 wherein the cyclobutane derivative is 2,2,4,4-tetraethyl 1,3-cyclobutanediol.

17. The method of claim 13 wherein the cyclobutane derivative is 2,2,4,4-tetraisopropyl 1,3-cyclobutanediol.

References Cited in the file of this patent

UNITED STATES PATENTS 2,936,324 Hasek et al. _____ May 10, 1960

UNITED STATES PATENT OFFICE
CERTIFICATE OF CORRECTION

Patent No. 3,004,889                  October 17, 1961

Samuel Kuna et al.

It is hereby certified that error appears in the above numbered patent requiring correction and that the said Letters Patent should read as corrected below.

Column 4, lines 15 and 34, for "analgesic", each occurrence, read -- analgesia --.

Signed and sealed this 3rd day of April 1962.

(SEAL)
Attest:

ERNEST W. SWIDER
Attesting Officer

DAVID L. LADD
Commissioner of Patents